US010132267B2

(12) United States Patent
Schepak et al.

(10) Patent No.: US 10,132,267 B2
(45) Date of Patent: Nov. 20, 2018

(54) COATED BORE ALUMINUM CYLINDER LINER FOR ALUMINUM CAST BLOCKS

(71) Applicant: Ford Global Technologies, LLC, Dearborn, MI (US)

(72) Inventors: Antony George Schepak, Howell, MI (US); Clifford E. Maki, New Hudson, MI (US); Mathew Leonard Hintzen, Stockbridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 14/972,144

(22) Filed: Dec. 17, 2015

(65) Prior Publication Data

US 2017/0175668 A1 Jun. 22, 2017

(51) Int. Cl.
*F02F 1/10* (2006.01)
*F02B 75/08* (2006.01)
(Continued)

(52) U.S. Cl.
CPC ................ *F02F 1/004* (2013.01); *C23C 4/08* (2013.01); *C23C 4/14* (2013.01); *F02B 75/22* (2013.01)

(58) Field of Classification Search
CPC .... F02F 1/004; F02F 1/16; C23C 4/08; C23C 4/14; F02B 75/22
(Continued)

(56) References Cited

U.S. PATENT DOCUMENTS 3,276,082 A 10/1966 Thomas
4,537,167 A 8/1985 Eudier et al.
(Continued)

FOREIGN PATENT DOCUMENTS

CN 101935783 B 1/2011
CN 102699081 A 10/2012
(Continued)

OTHER PUBLICATIONS

Adachi, S. et al., "Development of cylinder liner in the new rapidly solidified aluminum alloy extruded material," J. of Japan Institute of Light Metals, v. 53, n. 2 (2003), pp. 76-81.
(Continued)

*Primary Examiner* — Lindsay Low
*Assistant Examiner* — Syed O Hasan
(74) *Attorney, Agent, or Firm* — Julia Voutyras; Brooks Kushman, P.C.

(57) ABSTRACT

Engine blocks and methods of forming engine blocks are disclosed. The engine block may include a cast aluminum body and a plurality of cast-in liners. Each cast-in liner may include (a) an outer layer of 2xxx-series aluminum molecularly bonded to the cast aluminum body and (b) an inner layer directly contacting the outer layer and forming at least a portion of an engine bore. The inner layer may be a wear-resistant coating, such as a steel coating. The method may include extruding an elongated 2xxx-series aluminum extrusion having an inner cavity bounded by an inner surface and applying a wear-resistant coating to the inner surface. The extrusion may be sectioned into a plurality of cylinder liners and the cylinder liners may be into an aluminum engine block such that each cast-in liner forms at least a portion of an inner surface of an engine bore in the engine block.

14 Claims, 4 Drawing Sheets

(51) Int. Cl.

| | |
|---|---|
| ***B23P 11/00*** | (2006.01) |
| ***F02F 1/00*** | (2006.01) |
| ***C23C 4/14*** | (2016.01) |
| ***F02B 75/22*** | (2006.01) |
| ***C23C 4/08*** | (2016.01) |

(58) Field of Classification Search
USPC .................. 123/193.2, 668, 669; 29/888.061
See application file for complete search history.

(56) References Cited

U.S. PATENT DOCUMENTS

| | | | | |
|---|---|---|---|---|
| 5,255,433 | A | 10/1993 | Jin et al. | |
| 5,566,450 | A * | 10/1996 | Rao | F02B 69/00 29/888 |
| 5,671,532 | A | 9/1997 | Rao et al. | |
| 5,842,109 | A | 11/1998 | Akpan et al. | |
| 5,891,273 | A | 4/1999 | Rueckert et al. | |
| 6,044,820 | A | 4/2000 | Domanchuk et al. | |
| 6,328,026 | B1 | 12/2001 | Wang et al. | |
| 6,354,259 | B2 | 3/2002 | Fischer et al. | |
| 7,014,924 | B2 | 3/2006 | Koyama et al. | |
| 7,059,290 | B2 | 6/2006 | Ishikawa et al. | |
| 7,513,236 | B2 | 4/2009 | Miyamoto et al. | |
| 8,037,860 | B2 | 10/2011 | Takami et al. | |
| 8,122,941 | B2 | 2/2012 | Kim et al. | |
| 8,859,041 | B2 | 10/2014 | Sekikawa et al. | |
| 2003/0051713 | A1 * | 3/2003 | Bedwell | F02F 1/16 123/668 |
| 2005/0016489 | A1 | 1/2005 | Endicott et al. | |
| 2005/0199196 | A1 * | 9/2005 | Azevedo | F02F 1/16 123/41.84 |
| 2011/0232478 | A1 * | 9/2011 | Horigome | F02F 1/004 92/169.1 |
| 2015/0144090 | A1 | 5/2015 | Shin et al. | |

FOREIGN PATENT DOCUMENTS

| | | | |
|---|---|---|---|
| GB | 2 259 996 | A | 3/1993 |
| JP | 51151229 | | 12/1976 |
| JP | 51151414 | A | 12/1976 |
| JP | 5734346 | | 7/1982 |
| JP | 02104462 | A | 4/1990 |
| JP | 5086964 | B2 | 4/2010 |
| KR | 20090006502 | A | 1/2009 |
| WO | 2014/134694 | A1 | 9/2014 |

OTHER PUBLICATIONS

Morawitz, U. et al., “Benefits of Thermal Spray Coatings in Internal Combustion Engines, with Specific View on Friction Reduction and Thermal Management,” SAE International, published Apr. 8, 2013, 8 pgs.

Okaniwa, S. et al, “Extrusion Technology for Aluminum Cylinder Liners Using a Rapidly Solidified Powder Alloy,” Light Metal Age, Jun. 2003, pp. 22-26.

* cited by examiner

COATED BORE ALUMINUM CYLINDER LINER FOR ALUMINUM CAST BLOCKS

TECHNICAL FIELD

The present disclosure relates to coated bore aluminum cylinder liners, for example, for aluminum cast blocks.

BACKGROUND

Aluminum engine blocks generally include a cast iron liner or, if liner-less, include a coating on the bore surface. Cast iron liners generally increase the weight of the block and result in mismatched thermal properties between the aluminum block and the cast iron liners. For liner-less blocks, a sizeable investment may have to be made for each block that will receive a coating (e.g., a plasma coated bore process). The logistics to manufacture a liner-less block may be complex, which can increase the cost of production. In addition, geometric dimensional control to allow a uniform plasma coating thickness from top to bottom of the cylinder bore may be difficult.

SUMMARY

In at least one embodiment, an engine block is provided. The engine block may include a cast aluminum body; and a plurality of cast-in liners, each including (a) an outer layer of 2xxx-series aluminum molecularly bonded to the cast aluminum body and (b) an inner layer formed of a steel coating directly contacting the outer layer and forming at least a portion of an engine bore.

A bore wall portion of the cast aluminum body may at least partially extend over at least one of a top or a bottom of at least one cast-in liner. The outer layer of 2xxx-series aluminum may have a T4, T5, T6, or T351 temper. The outer layer of 2xxx-series aluminum may have an ultimate tensile strength (UTS) of at least 400 MPa and/or a fatigue strength of at least 100 MPa.

In at least one embodiment, a method is provided including extruding an elongated 2xxx-series aluminum extrusion having an inner cavity bounded by an inner surface; applying a wear-resistant coating to the inner surface; sectioning the extrusion into a plurality of cylinder liners; and casting at least some of the plurality of cylinder liners into an aluminum engine block such that each cast-in liner forms at least a portion of an inner surface of an engine bore in the engine block.

The method may include roughening the inner surface prior to applying the wear-resistant coating. The roughening step may include mechanical roughening. The casting step may include casting the cylinder liners into the aluminum engine block such that the cast aluminum engine block at least partially extends over at least one of a top or a bottom of each cast-in liner. The casting step may include casting the cylinder liners into the aluminum engine block such that an outer surface of each cast-in liner forms a molecular bond with the aluminum engine block.

In one embodiment, applying the wear-resistant coating to the inner surface includes inserting a coating sprayer into the inner cavity and rotating the extrusion about a longitudinal axis. The wear-resistant coating may be a steel coating. Applying the wear-resistant coating may include thermal spraying a plasma transferred wire arc (PTWA) coating. The casting step may include high pressure die casting.

In at least one embodiment, an engine block is provided. The engine block may include a plurality of cast-in liners, each including: an outer layer of 2xxx-series aluminum; and a wear-resistant coating directly contacting the outer layer and forming at least a portion of an engine bore; and a cast aluminum body molecularly bonded to the outer layer and at least partially extending over at least one of a top or a bottom of at least one cast-in liner.

The cast aluminum body may form a portion of at least one engine bore. A portion of the cast aluminum body may be coplanar with an inner surface of the wear-resistant coating that forms at least a portion of an engine bore. The cast aluminum body may contact a top and a bottom of both the outer layer and the wear-resistant coating of at least one cast-in liner. The wear-resistant coating may be a steel coating. In one embodiment, the outer layer of 2xxx-series aluminum has an ultimate tensile strength (UTS) of at least 400 MPa and a fatigue strength of at least 100 MPa.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
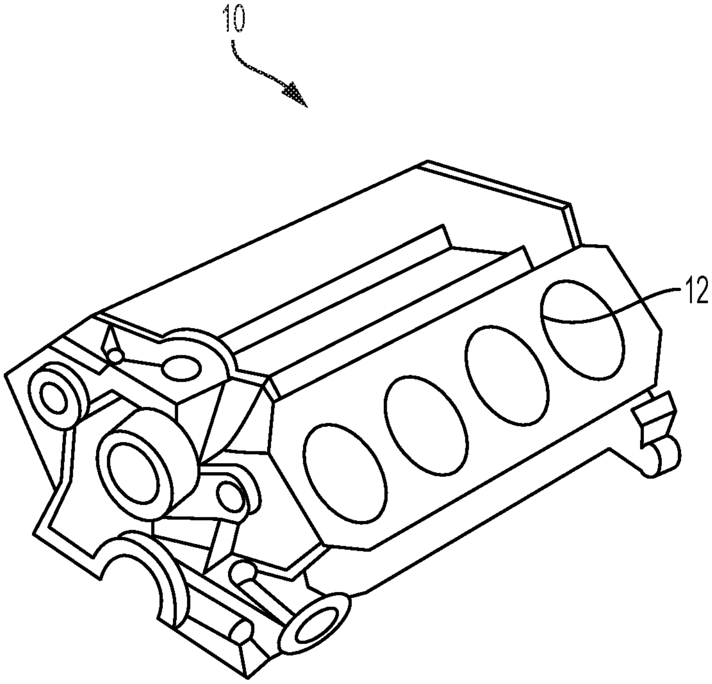
FIG. 1 is a schematic perspective view of an engine block.
Figure 2:
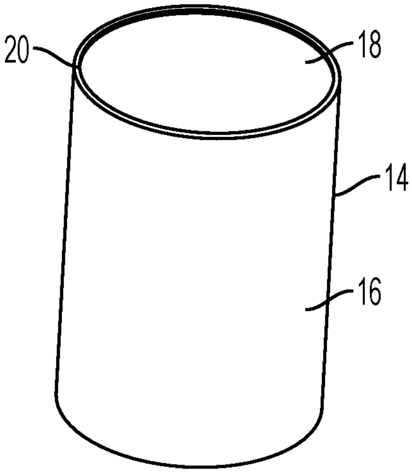
FIG. 2 is a perspective view of a cylinder liner, according to an embodiment.

With reference to FIG. 1, an engine or cylinder block 10 is shown. The engine block 10 may include one or more cylinder bores 12, which may be configured to house pistons of an internal combustion engine. The engine block body may be formed of any suitable material, such as aluminum, cast iron, magnesium, or alloys thereof. In at least one embodiment, the cylinder bores 12 in the engine block 10 may include cylinder liners 14, such as shown in FIG. 2. The liners 14 may be a hollow cylinder or tube having an outer surface 16, an inner surface 18, and a wall thickness 20.

In conventional engine blocks, if the engine block parent material is aluminum, then a cast iron liner or a coating may be provided in the cylinder bores to provide the cylinder bore with increased strength, stiffness, wear resistance, or other properties. For example, a cast iron liner may cast-in to the engine block or pressed into the cylinder bores after the engine block has been formed (e.g., by casting). In another example, the aluminum cylinder bores may be liner-less but may be coated with a coating after the engine block has been formed (e.g., by casting).

When a cast iron liner is used in the engine block cylinders, the manufacturing process generally includes the following steps: 1) casting the cast iron liner; 2) machining the cast iron liner to a certain geometry; 3) shipping the liner to a foundry; 4) casting the engine block (with or without the cast iron liner); 5) inserting the cast iron liner (if not cast in); 6) cubing operation (e.g., processing a rough casting into a semi-finished state and establishing datums for final machining) establishes cylinder bore center; 7) rough boring; 8) finish boring; and 9) honing.

When the engine block is a liner-less engine block, the manufacturing process generally includes the following steps: 1) casting the engine block; 2) cubing operation; 3) rough cut; 4) semi-rough cut; 5) roughen the inner diameter of the cylinder bores; 6) mask portions of the engine block to prevent coating overspray; 7) apply coating to the cylinder bores; 8) remove masking material; 9) finish boring; and 10) honing. To apply the coating in step #7, the whole engine block may have to be rotated or spun, which can be difficult and/or require additional equipment and space.

In at least one embodiment, the disclosed engine block 10 and liners 14 may be formed of aluminum (e.g., pure or an alloy). A hollow extrusion 22 may be formed to a length that is longer than a single liner 14, for example, a length of a plurality of liners. The hollow extrusion 22 may be a hollow cylinder, and the hollow extrusion 22 is referred to as a hollow cylinder 22 in the following description. However, the hollow extrusion 22 may have a non-circular outer surface and a circular inner surface. In one embodiment, the extruded hollow cylinder 22 may have a length of at least two liners 14, such as at least 4, 6, or 8 liners. In another embodiment, the extruded hollow cylinder 22 may have an absolute length of at least 2, 4, 6, or 8 feet.

Figure 3:
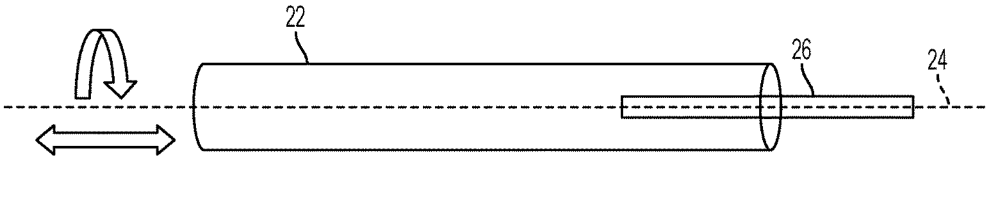
FIG. 3 is a schematic view of a liner coating system, according to an embodiment.

With reference to FIG. 3, the extruded hollow cylinder 22 may be extruded and provided with a coating prior to being cut into individual liners 14. Prior to applying the coating, the cylinder 22 may be machined and/or subjected to other forming, shaping, or texturing processes. In one embodiment, the inner and/or outer diameter of the cylinder 22 may be adjusted before the coating, for example, by turning or other processes. Since material is being removed, the outer diameter may be reduced to a certain dimension and the inner diameter may be increased to a certain dimension. Accordingly, the extruded cylinder 22 may have an outer diameter than is larger than a final dimension of the liners 14 and an inner diameter that is smaller than a final dimension of the liners 14.

In at least one embodiment, the inner and/or outer surface of the cylinder 22 may be textured or roughened prior to the coating being applied to the inner surface. Roughening the inner surface may improve the adhesion or bonding strength of the coating to the cylinder 22 and roughening or texturing of the outer surface may improve the adhesion or bonding strength of the cylinder/liner to the parent or cast material of the engine block. The roughening processes used on the inner and outer surfaces may be the same or different. The roughening process may be a mechanical roughening process, for example, using a tool with a cutting edge, grit blasting, or water jet. Other roughening processes may include etching (e.g., chemical or plasma), spark/electric discharge, or others.

In at least one embodiment, the cylinder 22 and liners 14 derived therefrom may be formed of aluminum, such as an aluminum alloy. The aluminum alloy may be a heat treatable alloy, for example, an alloy that can be precipitation or age hardened. In one embodiment, the cylinder 22 and liners 14 may be formed of a 2xxx series aluminum alloy. The 2xxx series of aluminum alloys (e.g., according to the IADS) includes copper as the major or principal alloying element (generally from 0.7 to 6.8 wt. %) and can be precipitation hardened to very high strength levels (relative to other aluminum alloys). The 2xxx series can generally be precipitation hardened to strengths greater than all but the 7xxx series of aluminum alloys. The 2xxx series alloys also retain high strength at elevated temperatures, such as about 150° C. For example, a comparison of a common 2xxx series alloy, 2024, and a common 6xxx series alloy, 6061, at a T6 temper (precipitation hardened to peak strength) and at room temperature and 150° C. is shown in Table 1 below:

TABLE 1

Comparison of mechanical properties.

| | Test Temperature | | | | |
|---|---|---|---|---|---|
| | 25° C. | | | 150° C. | |
| | Alloy & Heat-Treatment | | | | |
| | 2024-T6 | 6061-T6 | Typical Gray Cast Iron Used in Liners | 2024-T6 | 6061-T6 |
| Ultimate Tensile Strength (MPa) | 476 | 310 | 360 (min.) | 310 | 234 |
| Yield Strength (MPa) | 393 | 296 | — | 248 | 214 |
| % Elongation | 10 | 17 | — | 17 | 20 |
| 500 kg. Brinell Hardness | 130 | 95 | — | — | — |
| Relative Machinability (A = Best, E = Poorest) | B (Requires chip breakers to avoid continuous chips) | C (Continuous chips that are difficult to control) | A | — | — |

As shown in the table, the 2xxx series alloy, 2024, has a significantly higher UTS and YS at both room temperature (25° C.) and at an elevated temperature (150° C.). In fact, the UTS of the 2024 aluminum at 150° C. is equal to the UTS of the 6061 aluminum at room temperature. The 2024 aluminum also has a higher hardness. While the properties may vary based on the specific alloys within the 2xxx and 6xxx series, the general trends described above hold. For example, the cylinder 22 may be formed of a 2xxx series aluminum alloy having a UTS of at least 400, 425, 450, or 475 MPa and a YS of at least 300, 325, 350, 375, or 390 MPa at room temperature (e.g., 25° C.). While a T6 temper is shown in Table 1, other tempers may be used, such as T4, T5, or T351.

Table 1 also includes the UTS for a typical gray cast iron used for cylinder liners. As shown, the UTS for the cast iron is at least 360 MPa. The gray cast iron is therefore significantly stronger than the 6061 alloy, but has a UTS significantly lower than the 2024 alloy. The minimum UTS for conventional cast iron liners is substantially higher than the UTS of the 6xxx series, therefore, 6xxx series alloys may be unsuitable in some embodiments. In addition, gray cast iron typically has a fatigue strength of less than 75 MPa (e.g., about 62 MPa) and a thermal conductivity of less than 50 W/m-K (e.g., about 46.4 W/m-K). In contrast, the cylinder 22 and liners 14 may be formed of a 2xxx series aluminum alloy (e.g., 2024) having a fatigue strength of at least 100 MPa, such as at least 110, 120, or 130 MPa (e.g., 138 MPa) and a thermal conductivity of at least 100 W/m-K, such as at least 110 or 120 W/m-K (e.g., 121 W/m-K).

The 2xxx series of aluminum alloys may be less corrosion resistant than other alloy series, such as the 6xxx series. However, it has been discovered that the coating applied to the cylinder 22 may alleviate the corrosion potential. Accordingly, it has been discovered that a 2xxx series aluminum alloy may be used to form the cylinder liners 14. The alloy may have a higher UTS, YS, fatigue strength, and thermal conductivity than conventional cast iron liners and may have significantly higher UTS and YS than other aluminum alloys, such as the 6xxx series.

In addition, while a high elongation to failure is typically a positive property, it has been discovered that the lower elongation to failure of the 2xxx series is actually beneficial to the mechanical roughening process for the liners 14. For example, as shown in Table 1, 2024 aluminum has an elongation to failure of 10%, while the 6061 has an elongation to failure of 17%. It has been discovered that the higher elongation of the 6xxx series aluminum may result in long, wire-like material removal when using a cutting tool to roughen. This results in a surface that does not generally include discrete recesses for the coating to enter and mechanically interlock. In contrast, it has been found that the 2xxx series will more easily form such recesses. Accordingly, having reduced ductility is surprisingly a positive property of the 2xxx series aluminum compared to other alloy series (e.g., 6xxx). Non-limiting examples of specific 2xxx series alloys may include 2024, 2008, 2014, 2017, 2018, 2025, 2090, 2124, 2195, 2219, 2324, or modifications/variations thereof. The 2xxx alloys may also be defined based on mechanical properties, such as those described above (e.g., UTS, YS, fatigue strength, thermal conductivity, etc.).

In one embodiment, shown in FIG. 3, the cylinder 22 may be arranged on a horizontal axis 24 and rotated about the axis 24 while a coating is applied by a sprayer 26. Of course, the cylinder 22 may be arranged on any axis, such as vertical or an angle between horizontal and vertical. The sprayer 26 may be stationary, such that the rotation of the cylinder 22 causes the coating to be applied to the entire inner surface of the cylinder 22. However, in other embodiments, the sprayer 26 may rotate instead of (or in addition to) the cylinder 22.

In order to apply the coating along an entire length of the cylinder 22, or at least 75%, 85%, or 95% of the length of the cylinder 22, the cylinder 22 may be moved in a direction parallel to its longitudinal axis (e.g., while also rotating about an axis). For example, as shown in FIG. 3, the cylinder 22 may be moved in the horizontal direction when the cylinder 22 is arranged on the horizontal axis 24. However, if the cylinder 22 is arranged on another axis, it may be moved in a direction parallel thereto. In embodiments where the cylinder 22 is moved along its longitudinal axis, the sprayer 26 may remain stationary. For example, as shown in FIG. 3, the cylinder 22 may rotate about the axis 24 and also move horizontally in the axial direction while the sprayer 26 remains stationary. The interior surface of the cylinder 22 may therefore be coated with a sprayed coating along a length of the cylinder 22 without moving the sprayer 26.

While the sprayer 26 may be stationary and/or non-rotating, other configurations of the cylinder 22 and the sprayer 26 may also be used. For example, the cylinder 22 may rotate along an axis but may remain stationary in the axial direction and the sprayer 26 may move in the axial direction to coat the interior surface of the cylinder. Alternatively, the sprayer 26 and the cylinder 22 may both move in the axial direction. In another embodiment, the cylinder 22 may move in the axial direction but may not rotate around an axis, while the sprayer 26 may rotate around an axis but remain in the same axial position. The cylinder 22 may also remain completely stationary—not rotating or moving axially—while the sprayer both rotates around an axis and moves in the axial direction. Accordingly, any combination of the cylinder 22 and the sprayer 26 may move in the axial direction and/or rotate around an axis in order to coat the interior surface of the cylinder along its length.

The sprayer 26 may be any type of spraying device, such as a thermal spraying device. Non-limiting examples of thermal spraying techniques that may be used include plasma spraying, detonation spraying, wire arc spraying (e.g., plasma transferred wire arc, or PTWA), flame spraying, high velocity oxy-fuel (HVOF) spraying, warm spraying, or cold spraying. Other coating techniques may also be used, such as vapor deposition (e.g., PVD or CVD) or chemical/electrochemical techniques. In at least one embodiment, the sprayer 26 may be a plasma transferred wire arc (PTWA) spraying device.

The coating that is applied by the sprayer 26 or another coating technique may be any suitable coating that provides sufficient strength, stiffness, density, Poisson's ratio, fatigue strength, and/or thermal conductivity for an engine block cylinder bore. In at least one embodiment, the coating may be a steel coating. Non-limiting examples of suitable steel compositions may include any AISI/SAE steel grades from 1010 to 4130 steel. The steel may also be a stainless steel, such as those in the AISI/SAE 400 series (e.g., 420). However, other steel compositions may also be used. The coating is not limited to steels, and may be formed of, or include, other metals or non-metals. For example, the coating may be a ceramic coating, a polymeric coating, or an amorphous carbon coating (e.g., DLC or similar). The coating may therefore be described based on its properties, rather than a specific composition.

In one example, a metallic coating may have an adhesion strength of at least 45 MPa, as measured by the ASTM E633 method. In another example, a liner may have a minimum wear depth, such as 6 μm, following a wear test. For example, a liner having a 300 μm 1010 steel-based coating applied via a Plasma Twin Wire Arc system may be tested using a Cameron-Plint test device. Using this device with the following parameters: Mo—CrNi piston ring, 5W-30 oil at a temperature of 120 C, 350N load, 15 mm stroke length, and 10 Hz test frequency, the liner may have no more than a 6 μm wear depth after 100 hours of testing.

Figure 4:
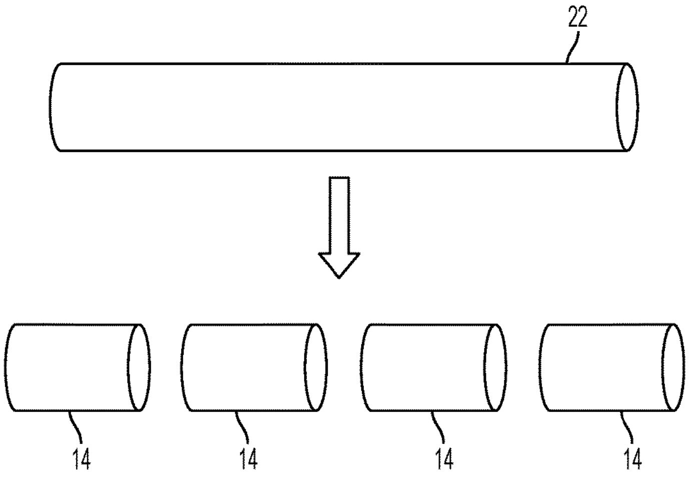
FIG. 4 is a schematic of an extruded hollow cylinder being sectioned into multiple cylinder liners, according to an embodiment.

With reference to FIG. 4, the coated cylinder 22 may be cut, sectioned, or divided into a plurality of liners 14 that are sized to be inserted into a cylinder bore 12 (e.g., by casting in). The liners 14 may be cut slightly longer than their final inserted length to allow for finishing or other final machining processes. In at least one embodiment, the cylinder 22 may be cut, sectioned, or divided into at least two liners 14, such as at least 4, 6, or 8 liners, or more. The cylinder 22 may be separated into the plurality of liners 14 using an suitable method, such as cutting (e.g., saw cutting), turning (e.g., using a lathe), laser, water jet, or other machining methods. While the cylinder 22 is shown as coated first before being cut into multiple liners 14, it is also contemplated that the cylinder 22 may be cut first and then each liner 14 may be coated individually. However, coating the cylinder 22 first may provide improved efficiency and reduce cycle times. Coating the cylinder 22 and sectioning it into multiple liners 14 may eliminate the extra processing that is required for thermally sprayed blocks (e.g., liner-less blocks) at the final machining line or at the foundry during cubing. It also provides greater confidence that the coating was applied uniformly to the defined engineering specifications before it is cast into the block. This reduces the scrap rate and scrap cost of the completed engine block because scrapping an out-of-spec liner is much less costly in terms of expense, time, and machine-hours than scrapping an out-of-spec engine block at the end of the process.

Figure 5:
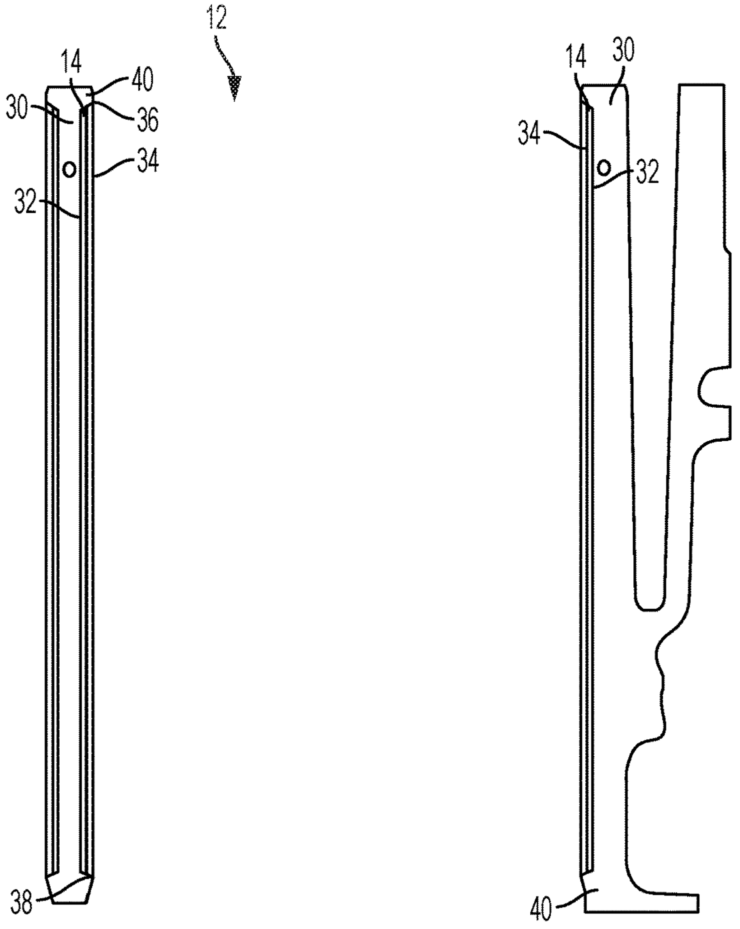
FIG. 5 shows a cross-section of a cast-in cylinder liner, according to an embodiment.
Figure 5A:
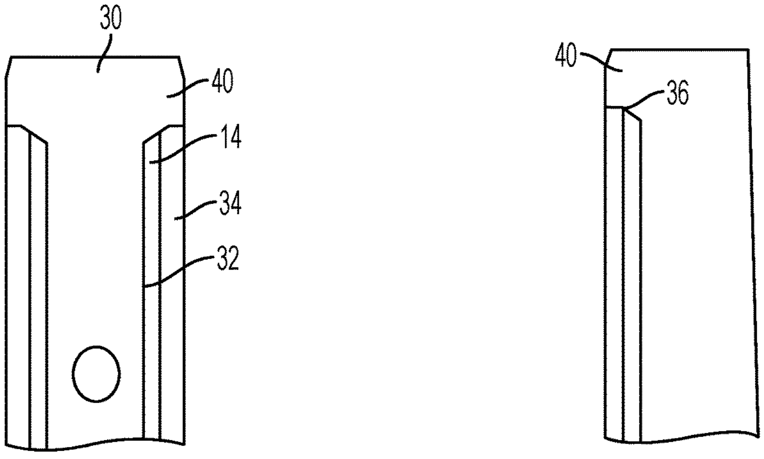
FIG. 5A shows an enlarged view of FIG. 5.

With reference to FIGS. 5 and 5A, the cylinder liners 14 may be cast-in to the cylinder bores 12 in the engine block 10. As described above, the engine block 10 may be formed of any suitable material, such as aluminum, cast iron, magnesium, or alloys thereof. In at least one embodiment, the engine block 10 is formed of aluminum (e.g., pure or an alloy thereof). The engine block 10 may be a cast engine block. The engine block 10 may be cast using any suitable casting method, such as die casting (e.g., low or high pressure die casting), permanent mold casting, sand casting, or others. These casting methods are known in the art and will not be described in detail. One of ordinary skill in the art, in view of the present disclosure, will be able to implement the cast-in process using casting processes known in the art.

In brief, die casting generally includes forcing a molten metal (e.g., aluminum) into a die or mold under pressure. High pressure die casting may use pressures of 8 bar or greater to force the metal into the die. Permanent mold casting generally includes the use of molds and cores. Molten metal may be poured into the mold, or a vacuum may be applied. In permanent mold casting, the molds are used multiple times. In sand casting, a replica or pattern of the finished product is generally pressed into a fine sand mixture. This forms the mold into which the metal (e.g., aluminum) is poured. The replica may be larger than the part to be made, to account for shrinkage during solidification and cooling.

In embodiments where the engine block 10 is formed of aluminum, it may be any suitable aluminum alloy or composition. Non-limiting examples of alloys that may be used as the engine block parent material include A319, A320, A356, A357, A359, A380, A383, A390, or others or modifications/variations thereof. The alloy used may depend on the casting type (e.g., sand, die cast, etc.). The parent aluminum alloy may be different than the liner (e.g., 2xxx series). As described above, the aluminum cylinder liners 14 may be cast-in to the cylinder bores 12 of the engine block 10. The liners 14 may be inserted into the appropriate casting components, depending on the specific casting process, prior to introduction of the molten aluminum. For example, in die casting, the cylinder liners 14 may be included in addition to, or as part of, the cores that form the cylinder bores 12.

After the liners 14 have been inserted into the mold, the casting of the engine block 10 may be performed. As a result of the casting process, the liners 14 may be incorporated into the engine block 10 (e.g., cast-in). During the casting process, the heated, liquid parent aluminum contacts the outer surface 16 of the liner 14. The high temperature of the parent aluminum may cause the outer surface 16 to melt. The melting may be localized to just the outer surface 16 of the liner 14, such that a majority of the wall thickness 20 is not affected or melted. In one embodiment, the melting of the outer surface 16 may be from 10 to 50 μm in from the outer surface, or any sub-range therein. For example, the melting may be limited to 10 to 45 μm, 15 to 40 μm, 15 to 45 μm, or 18 to 38 μm. The melting may occur on the entire outer surface 16 or only in certain portions or a certain percentage of the outer surface 16. When the parent aluminum cools and solidifies, it may therefore form a metallurgical or molecular bond with the melted portion of the outer surface 16. Accordingly, unlike a liner that is inserted after casting (e.g., by interference fit), the cast-in liner 14 may form a seamless metallurgical bond that is only detectable by metallurgical analysis. This metallurgical bond is very strong and may prevent any relative movement between the parent material and the liner (e.g., the block and the liner).

A cross-section of a single cylinder bore 12 having a cast-in liner 14 is shown in FIG. 5 (enlarged in FIG. 5A). The bore wall 30 may have an interface surface 32 that delineates the parent material from the liner 14. As described above, the parent material and the liner 14 may form a metallurgical or molecular bond such that there is no gap or space between the bore wall 30 and the outer surface 16 of the liner 14. Accordingly, the interface surface 32 may not be visible without metallurgical analysis, such as etching, high-powered microscopy, compositional analysis, or other techniques capable of discerning between two molecularly bonded materials.

As described above, the liner 14 may have a coating 34 applied on its inner surface 18 prior to the casting process. Accordingly, the cast-in liner 14 may include the coating 34 on its inner surface 18 and the coating 34 may form the innermost surface of at least a portion of the cylinder bore 12. In at least one embodiment, the cylinder 14 may be overmolded such that the parent material of the engine block 10 surrounds the liner 14 on the outer surface 16 and on top 36 and bottom 38 of the liner 14 (e.g., as shown in FIGS. 5 and 5A). The parent material may surround both the aluminum and the coating 34 of the liner 14. Overmolding of the liner 14 may further lock-in or anchor the liner 14 within the engine block 10 (e.g., in addition to the molecular bonding).

Stated another way, the liner 14 may be at least partially recessed within the bore wall 30 such that a portion 40 of the bore wall 30 at least partially extends over or overhangs the liner 14 on the top 36 and/or bottom 38 of the liner 14 (e.g., the aluminum and the coating). In one embodiment, the portion 40 of the bore wall 30 extends completely over or overhangs the liner 14 on the top 36 and/or bottom 38 of the liner 14. For example, a portion 40 of the bore wall 30 may be flush or substantially flush (e.g., coplanar) with the coating 34 on the top 36 and/or bottom 38 of the liner to form at least a portion of the innermost surface of the cylinder bore 12 (e.g., as shown in FIGS. 5 and 5A).

Figure 6:
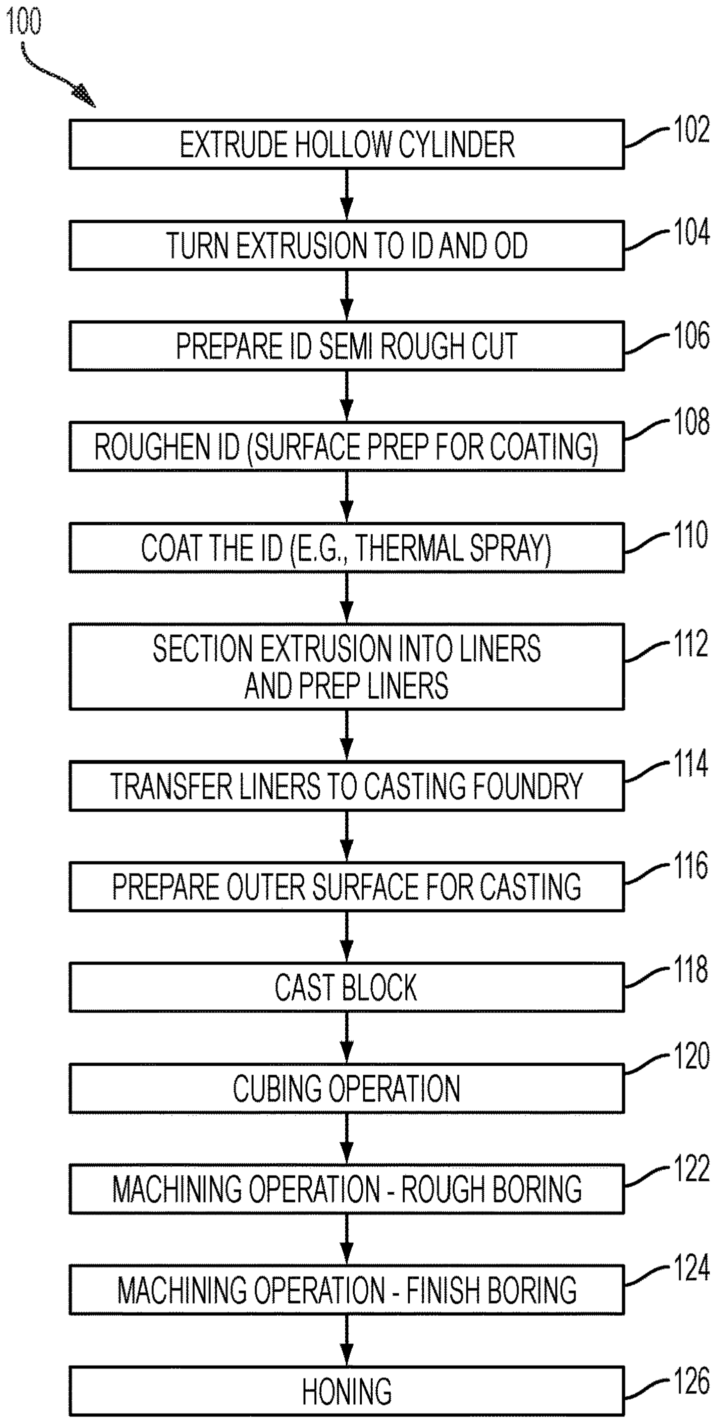
FIG. 6 is a flowchart of a method of forming an engine block with a cast-in liner, according to an embodiment.

While the various steps in forming an engine block with cast-in liners are described above, a flowchart 100 is shown in FIG. 6 describing an example of a method of forming an engine block with cast-in liners. In step 102, an elongated hollow extrusion (e.g., a cylinder) may be extruded having a length that is multiple times the length of a single cylinder liner. While the extrusion is shown and described as a hollow cylinder, the external shape of the extrusion may be non-circular (e.g., only the inner portion of the hollow extrusion may be circular in cross-section). In step 104, the extrusion may be turned to a predefined inner diameter (ID) and outer diameter (OD) (if the extrusion is a cylinder). In certain embodiments, the extrusion tolerances may be tight enough that step 104 is not required.

In step 106, the ID of the extrusion may be semi rough cut. This may include removing material from the inner diameter of the extrusion in order to further refine the ID. This step may be performed using a boring process, milling process, or other material removal methods. In step 108, the ID of the extrusion may be roughened in preparation for a coating to be applied. Roughening the ID may allow the coating to better bond to the extrusion, for example by increasing the mechanical interlocking between the coating and the ID. In one embodiment, the roughening may be mechanical roughening, described above. However, other roughening methods may also be used.

In step 110, the inner diameter of the extrusion may be coated with a coating. As described above, the coating may be sprayed on, for example, using a thermal spraying process such as plasma spraying or wire arc spraying (e.g., PTWA). The coating may be applied using a stationary sprayer while the extrusion rotates around the sprayer and/or the sprayer may rotate. The sprayer or the extrusion may be moved in an axial direction to coat the ID along at least a portion of the length of the extrusion (e.g., at least 95% of the length). To control splatter of the coating outside of the extrusion, a physical shield, air curtain, air duct exhaust, or other barriers may be used. The coating may be a steel coating and the coating may be applied directly to the inner diameter of the extrusion (i.e., without any intervening coatings).

In step 112, the coated extrusion may be sectioned, divided, or cut into multiple liners. The length of the extrusion and the length of the liners to be cut therefrom may determine the number of liners that are formed from each extrusion. In at least one embodiment, at least 5 liners may be cut from a single extrusion. While the extrusion is shown as coated first and then sectioned, the extrusion may also be sectioned first and then coated, however, coating the extrusion first may provide improved efficiency. The sectioned liners may then be prepped for insertion into a die/mold. In one embodiment, the inner diameter and/or the ends of the liners may be refined. For example, the coating may not be cylindrical after step 110 and may need to be processed to improve the cylindricity. The ends of the liners may need to be processed to bring their length into specification for casting or to shape the ends to be inserted into the die/mold cores. The processing of the coated liners may depend and vary based on the type of casting to be performed, such as sand casting or die casting, etc.

In step 114, the coated liners may be transferred (e.g., shipped) to a casting foundry to be cast-in to an engine block. In the embodiment shown, steps 102-112 are performed at a different location from the casting foundry, however, some or all of the steps may take place at the foundry. In addition, steps 102-112 may take place at multiple locations such that additional shipping steps may occur between the steps. In step 116, the outer surface of the liners may be prepared for casting. For example, the liners may be treated to remove oxides from the outer surface to facilitate casting and improve bonding between the liner and the parent material. The treatment may include chemical treatment (e.g., solvents) or mechanical treatment (e.g., polishing, grinding, grit blasting).

In step 118, the engine block may be cast with the liners cast-in. As described above, the casting may be performed using die casting (e.g., HPDC), permanent mold casting, or sand casting. The liners maybe cast-in using cylinder bore cores or other suitable methods. In step 120, a cubing operation may be performed. Cubing may include processing the rough casting into a semi-finished state and establishing datums for final machining. For example, the cubing step may establish the cylinder bore centers. In steps 122 and 124, rough boring and finish boring operations may be performed in order to further refine the inner diameter of the engine bores. While the steps are described as boring, other material removal processes may also be used, such as milling. Rough boring may increase the ID by a larger amount than finish boring. In step 126, a honing operation may be performed in order to further refine and finalize the inner diameter of the engine bores. The honing step may include multiple honing operations, such as rough and finish honing. Steps 120-126 may be the same or similar to the steps performed on cast iron liners. The disclosed process is therefore able to be incorporated or introduced into current manufacturing processes without completely overhauling the equipment or post-processing steps currently used. This may allow the disclosed process to be implemented in a cost and time effective manner.

The disclosed methods of forming an aluminum engine block having cast-in aluminum liners and the engine blocks formed thereby have numerous advantages and benefits over conventional engine blocks. In contrast to engine blocks in which a coating is applied after casting, the disclosed method eliminates several steps and simplifies others. For example, the steps of masking portions of the engine block to prevent coating overspray and removing the masking material are eliminated (e.g., steps #6 and #8 in the liner-less process described above). In addition, to coat the bores of a cast block, either the sprayer or the entire engine block must be rotated around the bore axis. Rotating the sprayer or rotating a large, heavy engine block adds additional complexity and difficulty to the coating process. In the disclosed method, a hollow extrusion can be rotated around a stationary sprayer. In addition to simplifying the process, this may also allow for multiple different extrusion diameters and lengths to be used with a single spray setup.

The disclosed methods and engine blocks also have advantages over cast-in iron liners or liners that are inserted after casting (e.g., by interference fit). The 2xxx series aluminum liners in the disclosed methods and engine blocks may have a lower density, higher UTS, higher fatigue strength, and higher thermal conductivity than cast iron liners. Due to the molecular, gap-free bonding between the cast-in aluminum liner and the parent aluminum, there is a reduction or elimination of leaks in the cooling paths around the engine bores. The seamless liner and engine bore also have very uniform mechanical properties around the perimeter of the bore, allowing the liner to distribute mechanical loads in addition to acting as a wear surface (the conventional purpose for the liner). The intimately bonded aluminum liner and aluminum parent material also have very similar thermal expansion properties.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine block, comprising:

a cast aluminum body; and a plurality of cast-in liners, each including (a) an outer layer of 2xxx-series aluminum molecularly bonded to the cast aluminum body and (b) an inner layer formed of a steel coating having a steel grade that ranges between AISI 1010 and 4130 directly contacting the outer layer and forming at least a portion of an engine bore.

2. The engine block of claim 1, wherein a bore wall portion of the cast aluminum body at least partially extends over at least one of a top or a bottom of at least one cast-in liner.

3. The engine block of claim 1, wherein the outer layer of 2xxx-series aluminum has an ultimate tensile strength (UTS) of at least 400 MPa.

4. The engine block of claim 1, wherein the outer layer of 2xxx-series aluminum has a fatigue strength of at least 100 MPa.

5. An engine block, comprising: a plurality of cast-in liners, each including: an outer layer of 2xxx-series aluminum having an elongation to failure that is ≤10% and configured to fragment when forming recesses within the outer layer; and a wear-resistant coating directly contacting the outer layer and forming at least a portion of an engine bore; a cast aluminum body molecularly bonded to the recesses of the outer layer; the wear-resistant coating comprised of steel having a steel grade that ranges between AISI 1010 and AISI 4130; and wherein the wear-resistant coating forms at least 75% of the engine bore.

6. The engine block of claim 5, wherein the cast aluminum body forms a portion of at least one engine bore.

7. The engine block of claim 6, wherein a portion of the cast aluminum body is coplanar with an inner surface of the wear-resistant coating that forms at least a portion of an engine bore.

8. The engine block of claim 5, wherein the cast aluminum body contacts a top and a bottom of both the outer layer and the wear-resistant coating of at least one cast-in liner.

9. The engine block of claim 5, wherein the wear-resistant coating is a steel coating.

10. The engine block of claim 5, wherein the outer layer of 2xxx-series aluminum has an ultimate tensile strength (UTS) of at least 400 MPa and a fatigue strength of at least 100 MPa.

11. The engine block of claim 1, wherein the steel coating is comprised of stainless steel.

12. The engine block of claim 1, wherein the outer layer of 2xxx-series aluminum has an elongation to failure that is ≤10% configured to fragment when forming recesses within the outer layer.

13. An engine block, comprising: a cast aluminum body; and a plurality of cast-in liners, each including (a) an outer layer of 2024-series aluminum, having an elongation to failure that is 10% and configured to fragment when forming recesses within the outer layer, molecularly bonded to the cast aluminum body and (b) an inner layer formed of a steel coating directly contacting the outer layer and forming at least 75% of an engine bore.

14. The engine block of claim 13, wherein the steel coating has a steel grade that ranges between AISI 1010 and 4130.

* * * * *